O. J. GROEHN & F. L. ALLDIS.
RADIATOR BRACKET.
APPLICATION FILED MAY 17, 1915.
1,189,562. Patented July 4, 1916.
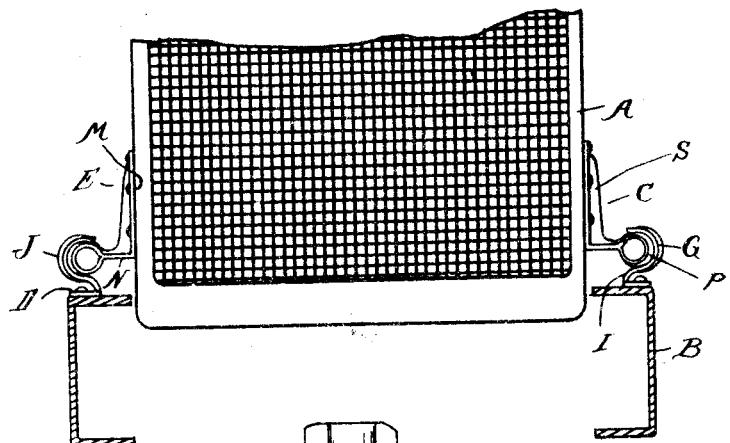
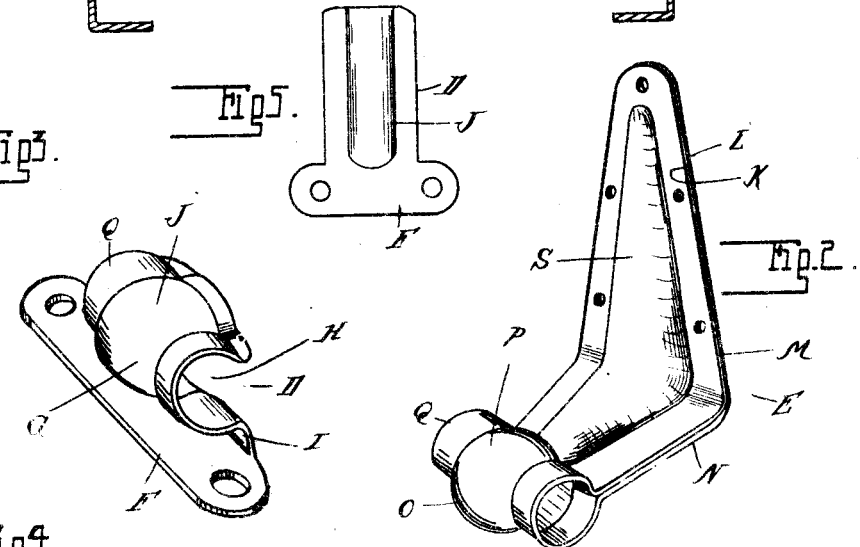
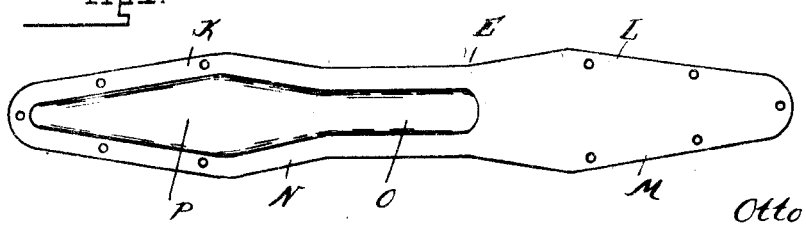
Inventors
Otto J. Groehn &
Frederick L. Alldis

UNITED STATES PATENT OFFICE.

OTTO J. GROEHN AND FREDERICK L. ALLDIS, OF DETROIT, MICHIGAN, ASSIGNORS TO BRISCOE MANUFACTURING CO., OF DETROIT, MICHIGAN, A CORPORATION OF MICHIGAN.

RADIATOR-BRACKET.

1,189,562.      Specification of Letters Patent.      Patented July 4, 1916.

Application filed May 17, 1915. Serial No. 28,587.

*To all whom it may concern:*

Be it known that we, OTTO J. GROEHN and FREDERICK L. ALLDIS, citizens of the United States of America, residing at Detroit, in the county of Wayne and State of Michigan, have invented certain new and useful Improvements in Radiator-Brackets, of which the following is a specification, reference being had therein to the accompanying drawings.

The invention relates to brackets for radiators of motor vehicles or the like, and resides in the novel construction of the bracket and the relation of certain parts thereof as will more fully hereinafter appear.

In the drawings, Figure 1 is a front elevation of a portion of a motor vehicle showing the improved bracket applied thereto; Figs. 2 and 3 are enlarged perspective views of the parts of the bracket; and Figs. 4 and 5 show the manner of forming the bracket parts.

It is general practice to connect the radiator of motor vehicles to the side sills of the chassis by means of brackets which will permit a limited relative movement between the chassis and the radiator, so that the latter will not be subjected to torsional strains, due to relative movement between the side sills of the chassis. These brackets, however, must be comparatively strong so as to form a proper mounting for the radiator. By our improvement we provide a strong and durable bracket and one that may be easily and cheaply manufactured.

As shown, A designates the radiator, B the side sills of the chassis, and C the brackets connecting the radiator and sills. These brackets each comprise two members D E. The member D is formed from a comparatively wide, flat blank and is shaped to provide a flat base portion F and a socket portion G. The socket portion is provided on the inner side thereof with an opening H and the lower inner edge of the socket is connected to the base portion by means of a neck I. Struck out from the socket portion is a bead J forming on the inner face of the socket portion a curved seat. The member E is also preferably formed of a flat metal blank bent upon itself to form two plies K and L for the base portion M and the neck section N. At the outer end of the neck section the two plies are separated and shaped to form a hollow head O. Struck out from the hollow head O is a bead P adapted to fit the seat of the socket formed by the bead J thereof. The opening H is slightly less than the diameter of the bead P, but as the socket portion is formed of metal having a certain amount of resiliency, the socket portion may be sprung over the bead P.

As will be noted, the socket portion and the head O are each provided with cylindrical extensions Q upon opposite sides of the beads, but the clearance between the portions Q is sufficient to allow the play desired.

As shown in Fig. 1, the base M of the member E is secured to the side of the radiator and is arranged at right angles to the neck portion N. In order to strengthen the neck portion and the base, there is struck out from the ply K a reinforcing rib S, this rib extending from the head throughout substantially the entire length of the ply K.

What we claim as our invention is:—

1. A radiator bracket, comprising a member provided with a substantially semi-cylindrical socket having a lateral opening, said socket being formed of resilient material, and a second member having a head insertible through said opening into engagement with the socket, said head being of a size to be sprung into engagement with the socket.

2. A radiator bracket, comprising two members each formed from a flat sheet metal blank, one of said members being shaped to provide a base and a socket; the other of said members having a base, a laterally-extending neck, and a head, said base and neck being formed of two plies of material and the plies being separated to form a hollow head, said head and socket having a universal joint connection.

3. A radiator bracket, comprising two members, one of said members being provided with a base and a socket portion having a lateral opening, said second member being formed of two plies of material and shaped to provide a base portion and a neck, the plies of material being separated to form a hollow head insertible through said lateral opening into engagement with the socket portion, and beads upon the head and socket portion providing a universal joint connection between said portions.

4. A radiator bracket, comprising two members each formed from a comparatively wide, flat sheet metal blank, one of said members being provided with a base and having a semi-cylindrical portion above said base, the opening of said semi-cylindrical portion being on the inner side, and said semi-cylindrical portion having a rounding head struck out therefrom, the second member being bent upon itself to provide a base and a neck portion of two plies of material, the plies of material being separated to form a hollow head, and a bead upon said hollow head complementary to the bead of the socket.

5. A radiator bracket, comprising a member having a cylindrical head formed with a central bead, and a member having a substantially semi-cylindrical socket portion, said portion having its interior face beaded outward to receive the head of the head when the latter is engaged in said socket, the two said members being engaged or disengaged by a relative movement of said members.

6. A radiator bracket, comprising a sheet-metal member having a substantially semi-cylindrical socket portion beaded to concave its interior face, and a member having a head portion curved to engage in said socket portion.

7. A radiator bracket, comprising a sheet-metal member bent upon itself to form a two ply neck section and a two ply base portion at one end of said neck section, and having an annular portion forming a head at the other end of said neck section, and a socket member for receiving said head.

8. A radiator bracket comprising a sheet-metal member having a head forming an annular portion of a sphere, said head having a projection parallel to the axis of the annulus, and a socket member shaped to receive said head, and having a portion encountered by said projection of the head to limit relative rotation of the two members about an axis transverse to that of said annulus, said head and socket being relatively rotatable to a limited extent about the axis of the annulus.

In testimony whereof we affix our signatures in presence of two witnesses.

OTTO J. GROEHN.
FREDERICK L. ALLDIS.

Witnesses:
JAMES P. BARRY,
PHYLLIS COBURN.